United States Patent
Tran et al.

(10) Patent No.: US 7,398,356 B2
(45) Date of Patent: Jul. 8, 2008

(54) CONTEXTUAL MEMORY INTERFACE FOR NETWORK PROCESSOR

(75) Inventors: Hoai V. Tran, Gilroy, CA (US); Kevin Jerome Rowett, Cupertino, CA (US); Somsubhra Sikdar, San Jose, CA (US); Jonathan Sweedler, Los Gatos, CA (US); Caveh Jalali, Redwood City, CA (US)

(73) Assignee: Mistletoe Technologies, Inc., Cupertino, CA (US)

( * ) Notice: Subject to any disclaimer, the term of this patent is extended or adjusted under 35 U.S.C. 154(b) by 258 days.

(21) Appl. No.: 11/181,117

(22) Filed: Jul. 13, 2005

(65) Prior Publication Data
US 2006/0020756 A1 Jan. 26, 2006

Related U.S. Application Data

(60) Provisional application No. 60/590,738, filed on Jul. 22, 2004.

(51) Int. Cl.
*G06F 12/00* (2006.01)
(52) U.S. Cl. ................................... 711/119; 711/122
(58) Field of Classification Search ................. None
See application file for complete search history.

(56) References Cited

U.S. PATENT DOCUMENTS

| | | | |
|---|---|---|---|
| 5,193,192 A | 3/1993 | Seberger | |
| 5,487,147 A | 1/1996 | Brisson | |
| 5,781,729 A | 7/1998 | Baker et al. | |
| 5,793,954 A | 8/1998 | Baker et al. | |
| 5,805,808 A | 9/1998 | Hasani et al. | |
| 5,916,305 A | 6/1999 | Sikdar | |
| 5,991,539 A | 11/1999 | Williams | |
| 6,000,041 A | 12/1999 | Baker et al. | |
| 6,034,963 A | 3/2000 | Minami et al. | |
| 6,085,029 A | 7/2000 | Kolawa et al. | |
| 6,122,757 A | 9/2000 | Kelley | |
| 6,145,073 A | 11/2000 | Cismas | |
| 6,266,700 B1 | 7/2001 | Baker et al. | |
| 6,269,427 B1 * | 7/2001 | Kuttanna et al. | 711/140 |
| 6,330,659 B1 | 12/2001 | Poff et al. | |
| 6,356,950 B1 | 3/2002 | Tillmann et al. | |
| 6,493,761 B1 | 12/2002 | Baker et al. | |
| 6,985,964 B1 | 1/2006 | Petersen et al. | |
| 2001/0056504 A1 | 12/2001 | Kuznetsov | |

(Continued)

OTHER PUBLICATIONS

*Can Programming be Liberated from the von Neumann Style? A Functional Style and Its Algebra of Programs* (John Bakus, Communications of the ACM, Aug. 1978, vol. 21, No. 8, pp. 613-641).

(Continued)

*Primary Examiner*—Than Nguyen
(74) *Attorney, Agent, or Firm*—Stolowitz Ford Cowger LLP

(57) ABSTRACT

A memory subsystem includes multiple different caches configured for different types of data transfer operations between one or more processing units and a main memory. The different caches can include a first general cache configured for general random memory accesses, a software controlled cache used for controlling cache operations for different processing devices accessing the same data, and a streaming cache configured for large packet data memory accesses. An arbiter may be used for arbitrating requests by the multiple different caches for accessing the main memory.

26 Claims, 15 Drawing Sheets

U.S. PATENT DOCUMENTS

| | | |
|---|---|---|
| 2002/0078115 A1 | 6/2002 | Poff et al. |
| 2003/0014588 A1* | 1/2003 | Hu et al. .................... 711/118 |
| 2003/0060927 A1 | 3/2003 | Gerbi et al. |
| 2003/0165160 A1 | 9/2003 | Minami et al. |
| 2004/0062267 A1 | 4/2004 | Minami et al. |
| 2004/0081202 A1 | 4/2004 | Minami et al. |
| 2005/0010723 A1* | 1/2005 | Cho et al. ................... 711/118 |
| 2005/0021825 A1 | 1/2005 | Kishore |
| 2005/0165966 A1 | 7/2005 | Gai et al. |

OTHER PUBLICATIONS

*Compliers Principles, Techniques and Tools* (Alfred V. Aho, Ravi Sethi, Jeffrey D. Ullman, Mar. 1998, pp. 186-192, 216-257).

* cited by examiner

US 7,398,356 B2

CONTEXTUAL MEMORY INTERFACE FOR NETWORK PROCESSOR

REFERENCE TO RELATED APPLICATIONS

This application claims priority from U.S. Provisional Application Ser. No. 60/590,738 filed Jul. 22, 2004 and is incorporated herein by reference. Copending U.S. patent application Ser. No. 10/351,030, entitled "Reconfigurable Semantic Processor," filed by Somsubhra Sikdar on Jan. 24, 2003, is incorporated herein by reference.

BACKGROUND

Network processing devices need to read and write to memory for different types of data. These different data types have different characteristics. For example, control type data may require relatively random address accesses in memory with relatively small data transfers for each memory access.

Other types of data, such as streaming data, may be located within a same contiguous address region in memory and may require relatively large data transfers each time memory is accessed. In one example, streaming data refers to a stream of packet data that may all be related to a same Internet session. For example, a stream of video or audio data carried in packets over a same Internet connection.

Current memory architectures do not optimize memory access for these different types of data within the same computing system. For example, many memory architectures use a cache to improve memory performance by caching a subset of data from a main Dynamic Random Access Memory (DRAM). The cache may use a Static Random Access Memory (SRAM) or other buffers that provide faster memory accesses for the subset of data in the cache. The cache is continuously and automatically updated with data from the DRAM that has most recently been accessed. The oldest accessed address locations in the cache are automatically replaced with the newest accessed address locations.

These conventional cache architectures do not efficiently handle different types of memory transfers, such as the streaming data mentioned above. For example, one memory transfer of streaming packet data may completely replace all the entries in the cache. When the streaming data transfer is completed, the cache then has to replace the contents of the cache again other non-streaming data, for example, with data used for conducting control operations. This continuous replacement of entries in the cache may actually slow down memory access time.

Another problem exists because the cache is not configured to efficiently access both streaming data and smaller sized control data. For example, the size of the cache lines may be too small to efficiently cache the streaming data. On the other hand, large cache lines may be too large to effectively cache the smaller randomly accessed control data.

The present invention addresses this and other problems associated with the prior art.

SUMMARY OF THE INVENTION

A memory subsystem includes multiple different caches configured for different types of data transfer operations between one or more processing units and a main memory. The different caches can include a first general cache configured for general random memory accesses, a software controlled cache used for controlling cache operations for different processing devices accessing the same data, and a streaming cache configured for large packet data memory accesses. An arbiter may be used for arbitrating requests by the multiple different caches for accessing the main memory.

The foregoing and other objects, features and advantages of the invention will become more readily apparent from the following detailed description of a preferred embodiment of the invention which proceeds with reference to the accompanying drawings.

DESCRIPTION OF THE DRAWINGS

The invention may be best understood by reading the disclosure with reference to the drawings, wherein.

DETAILED DESCRIPTION

Figure 1:
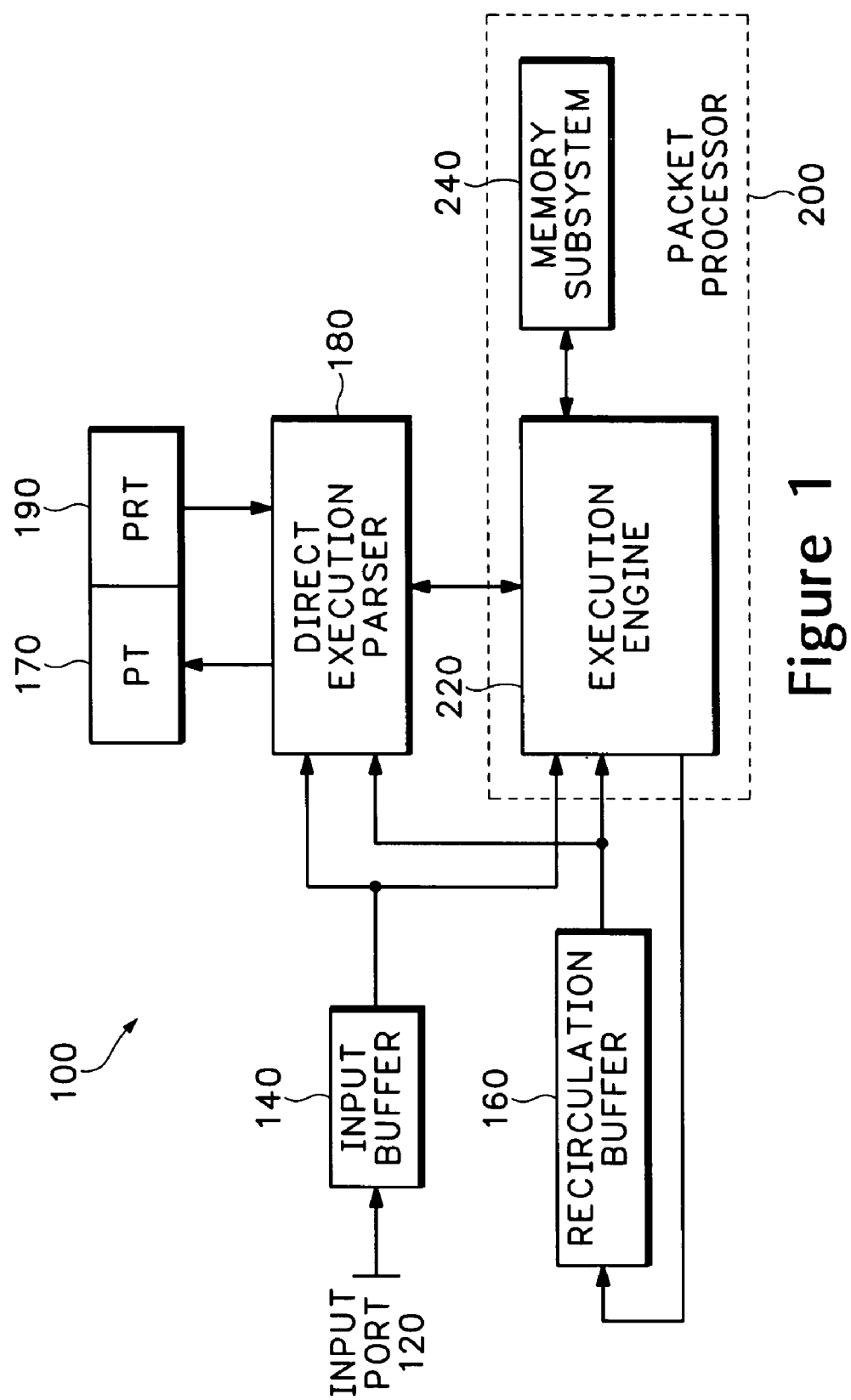
FIG. 1 illustrates, in block form, a semantic processor useful with embodiments of the present invention.

FIG. 1 shows a block diagram of a semantic processor 100 according to an embodiment of the invention. The semantic processor 100 contains an input buffer 140 for buffering a packet data stream received through the input port 120, a direct execution parser (DXP) 180 that controls the processing of packet data received at the input buffer 140 and a recirculation buffer 160, and a packet processor 200 for processing packets. The input buffer 140 and recirculation buffer 160 are preferably first-in-first-out (FIFO) buffers. The packet processor 200 is comprised of an execution engine 220 for processing segments of the packets or for performing other operations, and a memory subsystem 240 for storing and/or augmenting segments of the packets.

The DXP 180 controls the processing of packets or frames within the input buffer 140 (e.g., the input "stream") and the recirculation buffer 160 (e.g., the recirculation "stream"). Since the DXP 180 parses the input stream from input buffer 140 and the recirculation stream from the recirculation buffer 160 in a similar fashion, only the parsing of the input stream will be described below.

The DXP 180 maintains an internal parser stack of terminal and non-terminal symbols, based on parsing of the current frame up to the current symbol. When the symbol (or symbols) at the top of the parser stack is a terminal symbol, DXP 180 compares data at the head of the input stream to the terminal symbol and expects a match in order to continue. When the symbol at the top of the parser stack is a non-terminal symbol, DXP 180 uses the non-terminal symbol and current input data to expand the grammar production on the stack. As parsing continues, DXP 180 instructs execution engine 220 to process segments of the input, or perform other operations.

Semantic processor 100 uses at least two tables. Complex grammatical production rules are stored in a production rule table (PRT) 190. Codes for retrieving those production rules are stored in a parser table (PT) 170. The codes in parser table 170 also allow DXP 180 to determine, for a given production rule, the processing the packet processor 200 should perform upon a segment of a packet.

Some embodiments of the present invention contain many more elements than those shown in FIG. 1, but these essential elements appear in every system or software embodiment. A description of the packet flow within the semantic processor shown in FIG. 1 will thus be given before more complex embodiments are addressed.

Figure 2:
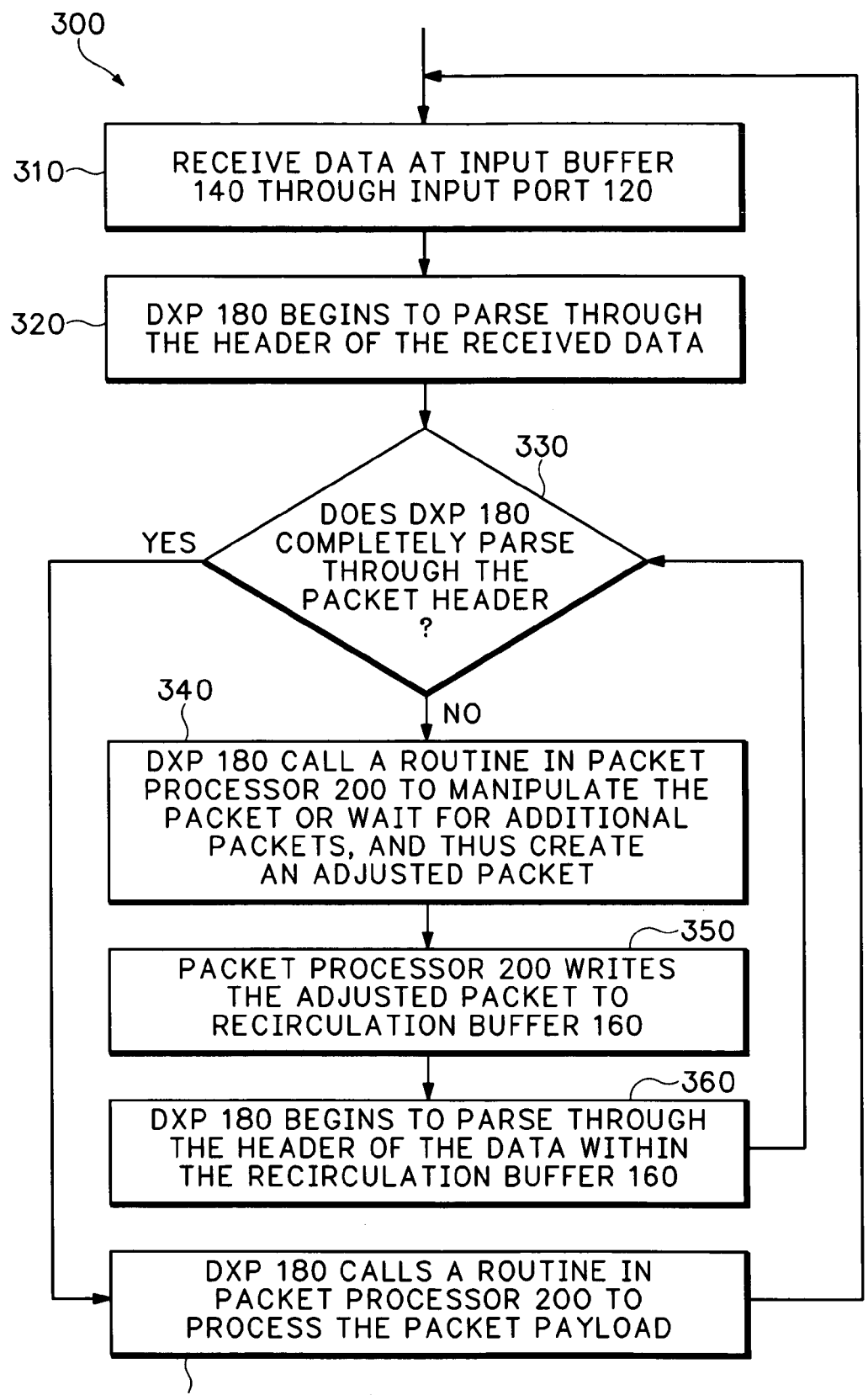
FIG. 2 contains a flow chart for the processing of received packets in the semantic processor with the recirculation buffer in FIG. 1.

FIG. 2 contains a flow chart 300 for the processing of received packets through the semantic processor 100 of FIG. 1. The flowchart 300 is used for illustrating a method of the invention.

According to a block 310, a packet is received at the input buffer 140 through the input port 120. According to a next block 320, the DXP 180 begins to parse through the header of the packet within the input buffer 140. In the case where the packet needs no additional manipulation or additional packets to enable the processing of the packet payload, the DXP 180 will completely parse through the header. In the case where the packet needs additional manipulation or additional packets to enable the processing of the packet payload, the DXP 180 will cease to parse the header.

According to a decision block 330, it is inquired whether the DXP 180 was able to completely parse through the header. If the DXP 180 was able to completely parse through the header, then according to a next block 370, the DXP 180 calls a routine within the packet processor 200 to process the packet payload and the semantic processor 100 waits for a next packet to be received at the input buffer 140 through the input port 120.

If the DXP 180 had to cease parsing the header, then according to a next block 340, the DXP 180 calls a routine within the packet processor 200 to manipulate the packet or wait for additional packets. Upon completion of the manipulation or the arrival of additional packets, the packet processor 200 creates an adjusted packet.

According to a next block 350, the packet processor 200 writes the adjusted packet (or a portion thereof) to the recirculation buffer 160. This can be accomplished by either enabling the recirculation buffer 160 with direct memory access to the memory subsystem 240 or by having the execution engine 220 read the adjusted packet from the memory subsystem 240 and then write the adjusted packet to the recirculation buffer 160. Optionally, to save processing time within the packet processor 200, a specialized header can be written to the recirculation buffer 160 instead of the entire adjusted packet. This specialized header directs the packet processor 200 to process the adjusted packet without having to transfer the entire packet out of packet processor's memory sub-system 240.

According to a next block 360, the DXP 180 begins to parse through the header of the data within the recirculation buffer 160. Execution is then returned to block 330, where it is inquired whether the DXP 180 was able to completely parse through the header. If the DXP 180 was able to completely parse through the header, then according to a next block 370, the DXP 180 calls a routine within the packet processor 200 to process the packet payload and the semantic processor 100 waits for a next packet to be received at the input buffer 140 through the input port 120.

If the DXP 180 had to cease parsing the header, execution returns to block 340 where the DXP 180 calls a routine within the packet processor 200 to manipulate the packet or wait for additional packets, thus creating an adjusted packet. The packet processor 200, then, writes the adjusted packet to the recirculation buffer 160 and the DXP 180 begins to parse through the header of the packet within the recirculation buffer 160.

Figure 3:
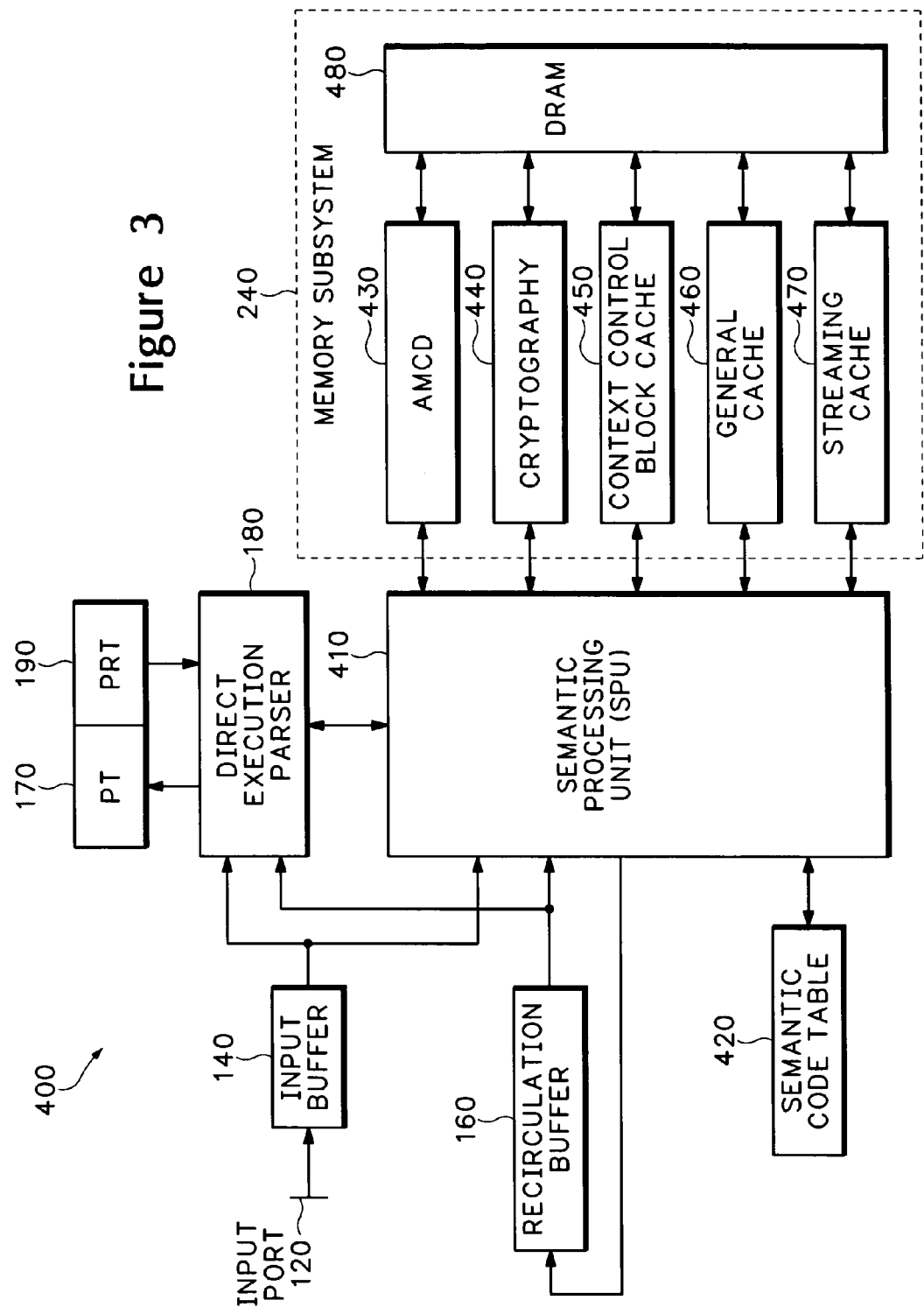
FIG. 3 illustrates another more detailed semantic processor implementation useful with embodiments of the present invention.

FIG. 3 shows another semantic processor embodiment 400, and the memory subsystem 240 in more detail. Semantic processor 400 contains an Array Machine-Context Data memory (AMCD) 430 for accessing data in dynamic random access memory (DRAM) 480 through a hashing function or content-addressable memory (CAM) lookup, a cryptography circuit 440 for the encryption, decryption or authentication of data, a context control block cache 450 for caching context control blocks to and from DRAM 480, a general cache 460 for caching data used in general memory access operations, and a streaming cache 470 for caching data streams as they are being written to and read from DRAM 480. The context control block cache 450 is preferably a software-controlled cache, i.e., a Semantic Processing Unit (SPU) 410 determines when a cache line is used and freed. Each of the five circuits 430, 440, 450, 460 and 470 is coupled between DRAM 480 and the SPU 410. The SPU 410, when signaled by the DXP 180, processes segments of packets or performs other operations. When DXP 180 determines that an SPU task is to be launched at a specific point in its parsing, DXP 180 signals SPU 410 to load microinstructions from semantic code table (SCT) 420. The loaded microinstructions are then executed by the SPU 410 and the segment of the packet is processed accordingly.

Figure 4:
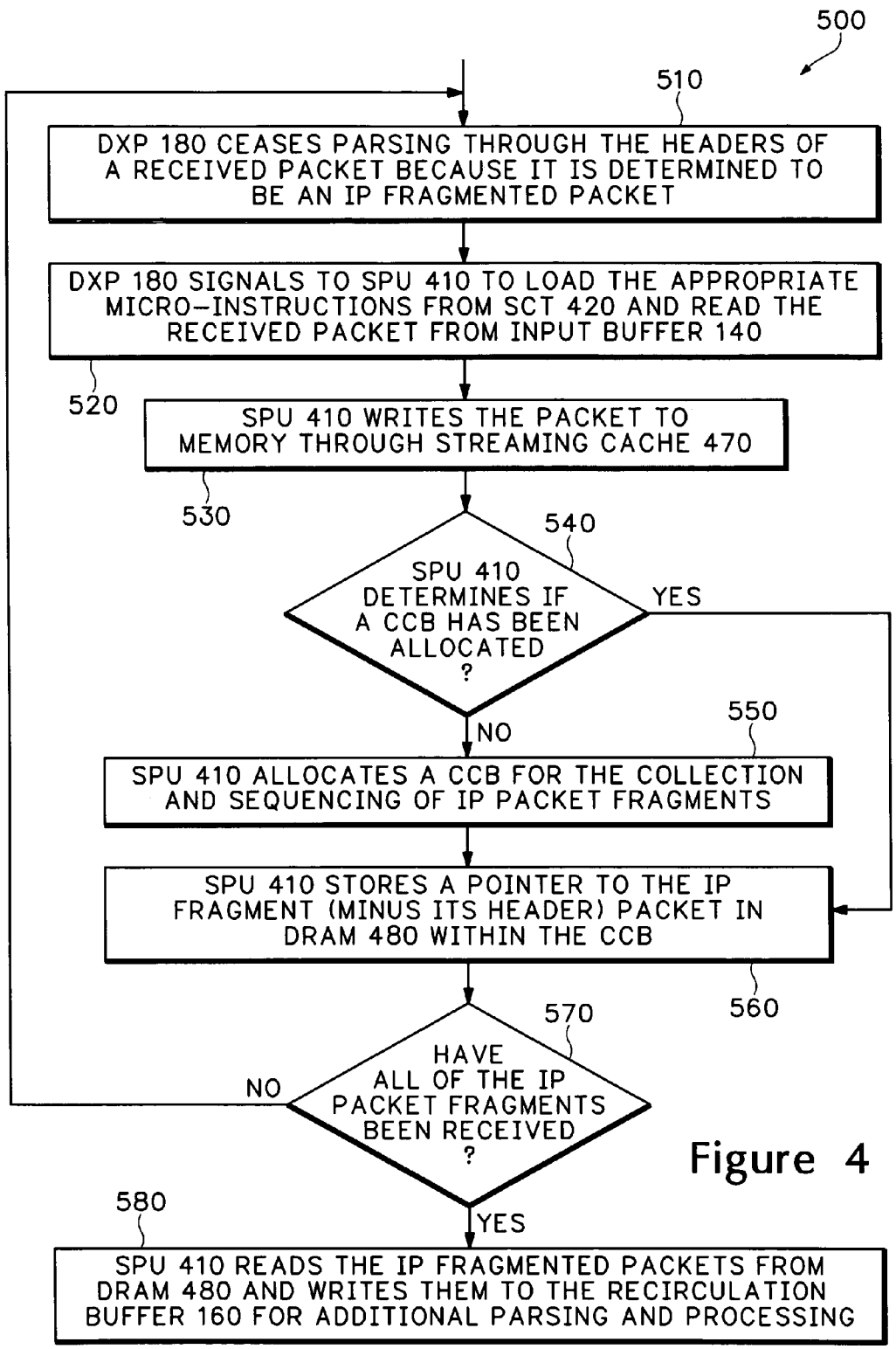
FIG. 4 contains a flow chart of received IP fragmented packets in the semantic processor in FIG. 3.

FIG. 4 contains a flow chart 500 showing one example of how received Internet Protocol (IP)-fragmented packets are processed through the semantic processor 400 of FIG. 3. The flowchart 500 is used for illustrating one method according to an embodiment of the invention.

Once a packet is received at the input buffer 140 through the input port 120 and the DXP 180 begins to parse through the headers of the packet within the input buffer 140, according to a block 510, the DXP 180 in this example ceases parsing through the headers of the received packet because the packet is determined to be an IP-fragmented packet. Preferably, the DXP 180 completely parses through the IP header, but ceases to parse through any headers belonging to subsequent layers (such as TCP, UDP, iSCSI, etc.).

According to a next block 520, the DXP 180 signals to the SPU 410 to load the appropriate microinstructions from the SCT 420 and read the received packet from the input buffer 140. According to a next block 530, the SPU 410 writes the received packet to DRAM 480 through the streaming cache 470. Although blocks 520 and 530 are shown as two separate steps they can be optionally performed as one step with the SPU 410 reading and writing the packet concurrently. This concurrent operation of reading and writing by the SPU 410 is known as SPU pipelining, where the SPU 410 acts as a conduit or pipeline for streaming data to be transferred between two blocks within the semantic processor 400.

According to a next decision block 540, the SPU 410 determines if a Context Control Block (CCB) has been allocated for the collection and sequencing of the correct IP packet fragment. The CCB for collecting and sequencing the fragments corresponding to an IP-fragmented packet, preferably, is stored in DRAM 480. The CCB contains pointers to the IP fragments in DRAM 480, a bit mask for the IP-fragments packets that have not arrived, and a timer value to force the semantic processor 400 to cease waiting for additional IP-fragments packets after an allotted period of time and to release the data stored in the CCB within DRAM 480.

The SPU 410 preferably determines if a CCB has been allocated by accessing the content-addressable memory (CAM) lookup function in AMCD 430 using the IP source address of the received IP fragmented packet combined with the identification and protocol from the header of the received IP packet fragment as a key. Optionally, the IP fragment keys are stored in a separate CCB table within DRAM 480 and are accessed with the CAM in AMCD 430 by using the IP source address of the received IP fragmented packet combined with the identification and protocol from the header of the received IP packet fragment. This optional addressing of the IP fragment keys avoids key overlap and sizing problems.

If the SPU 410 determines that a CCB has not been allocated for the collection and sequencing of fragments for a particular IP-fragmented packet, execution then proceeds to a block 550 where the SPU 410 allocates a CCB. The SPU 410 preferably enters a key corresponding to the allocated CCB, the key comprising the IP source address of the received IP fragment and the identification and protocol from the header of the received IP fragmented packet, into an IP fragment CCB table within the AMCD 430, and starts the timer located in the CCB. When the first fragment for given fragmented packet is received, the IP header is also saved to the CCB for later recirculation. For further fragments, the IP header need not be saved.

Once a CCB has been allocated for the collection and sequencing of IP-fragmented packet, according to a next block 560, the SPU 410 stores a pointer to the IP-fragment (minus its IP header) packet in DRAM 480 within the CCB. The pointers for the fragments can be arranged in the CCB as, e.g. a linked list. Preferably, the SPU 410 also updates the bit mask in the newly allocated CCB by marking the portion of the mask corresponding to the received fragment as received.

According to a next decision block 570, the SPU 410 determines if all of the IP-fragments from the packet has been received. Preferably, this determination is accomplished by using the bit mask in the CCB. A person of ordinary skill in the art can appreciate that there are multiple techniques readily available to implement the bit mask, or an equivalent tracking mechanism, for use with the present invention.

If all of the IP-fragments have not been received for the fragments packet, then the semantic processor 400 defers further processing on that fragmented packet until another fragment is received.

If all of the IP-fragments have been received, according to a next block 580, the SPU 410 resets the timer, reads the IP fragments from DRAM 480 in the correct order and writes them to the recirculation buffer 160 for additional parsing and processing. Preferably, the SPU 410 writes only a specialized header and the first part of the reassembled IP packet (with the fragmentation bit unset) to the recirculation buffer 160. The specialized header enables the DXP 180 to direct the processing of the reassembled IP-fragmented packet stored in DRAM 480 without having to transfer all of the IP fragmented packets to the recirculation buffer 160. The specialized header can consist of a designated non-terminal symbol that loads parser grammar for IP and a pointer to the CCB. The parser 180 can then parse the IP header normally, and proceed to parse higher-layer (e.g., TCP) headers.

Figure 5A:
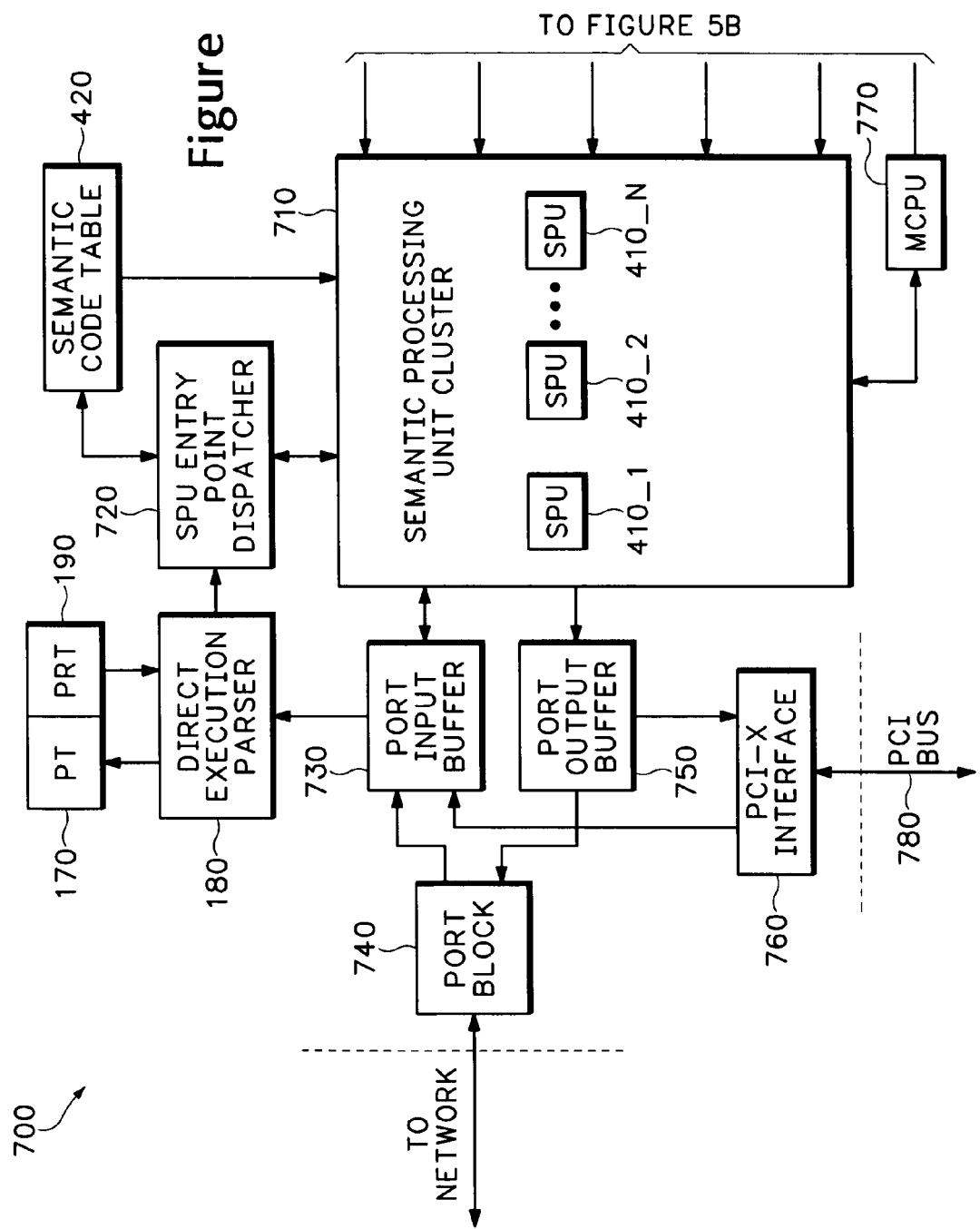
FIG. 5 illustrates yet another semantic processor implementation useful with embodiments of the present invention.
Figure 5B:
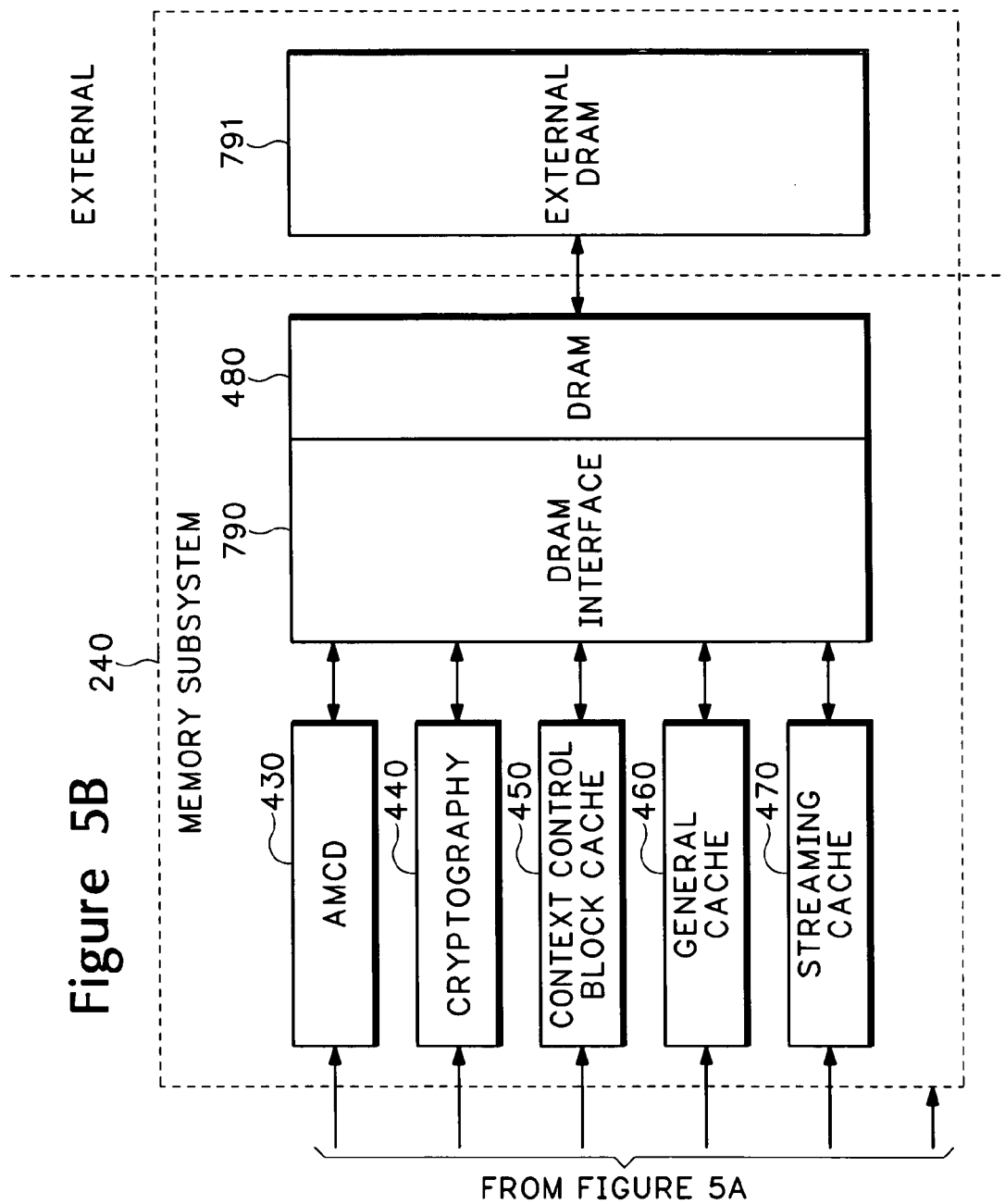

FIG. 5 shows yet another semantic processor embodiment. Semantic processor 700 contains a Semantic Processing Unit (SPU) cluster 710 containing a plurality of Semantic Processing Units (SPUs) 410-1, 410-2, to 410-N. Preferably, each of the SPUs 410-1 to 410-N are identical and have the same functionality. The SPU cluster 710 is coupled to the memory subsystem 240, a Semantic Entry Point (SEP) dispatcher 720, the SCT 420, port input buffer (PIB) 730, port output buffer (POB) 750, and a Maintenance Central Processing Unit (MCPU) 770.

When DXP 180 determines that a SPU task is to be launched at a specific point in parsing, DXP 180 signals SEP dispatcher 720 to load microinstructions from semantic code table (SCT) 420 and allocate one of the SPUs from the plurality of SPUs 410-1 to 410-N within the SPU cluster 710 to perform the task. The loaded microinstructions and task to be performed are then sent to the allocated SPU. The allocated SPU 410 then executes the microinstructions and the data packet is processed accordingly. The SPU 410 can optionally load microinstructions from the SCT 420 directly when instructed by the SEP dispatcher 720.

The PIB 730 contains at least one network interface input buffer a recirculation buffer, and a Peripheral Component Interconnect (PCI-X) input buffer. The POB 750 contains at least one network interface output buffer and a Peripheral Component Interconnect (PCI-X) output buffer. The port block 740 contains one or more ports, each comprising a physical interface, e.g., an optical, electrical, or radio frequency driver/receiver pair for an Ethernet, Fibre Channel, 802.11x, Universal Serial Bus, Firewire, or other physical layer interface. Preferably, the number of ports within port block 740 corresponds to the number of network interface input buffers within the PIB 730 and the number of output buffers within the POB 750.

The PCI-X interface 760 is coupled to a PCI-X input buffer within the PIB 730, a PCI-X output buffer within the POB 750, and an external PCI bus 780. The PCI bus 780 can connect to other PCI-capable components, such as disk drive, interfaces for additional network ports, etc.

The MCPU 770 is coupled with the SPU cluster 710 and memory subsystem 240. MCPU 770 performs any desired functions for semantic processor 700 that can reasonably be accomplished with traditional software. These functions are usually infrequent, non-time-critical functions that do not warrant inclusion in SCT 420 due to complexity. Preferably, MCPU 770 also has the capability to communicate with the dispatcher in SPU cluster 720 in order to request that a SPU perform tasks on the MCPU's behalf.

In an embodiment of the invention, the memory subsystem 240 is further comprised of a DRAM interface 790 that couple the AMCD 430, cryptography block 440, context control block cache 450, general cache 460 and streaming cache 470 to DRAM 480 and external DRAM 791.

Memory Subsystem

Figure 6:
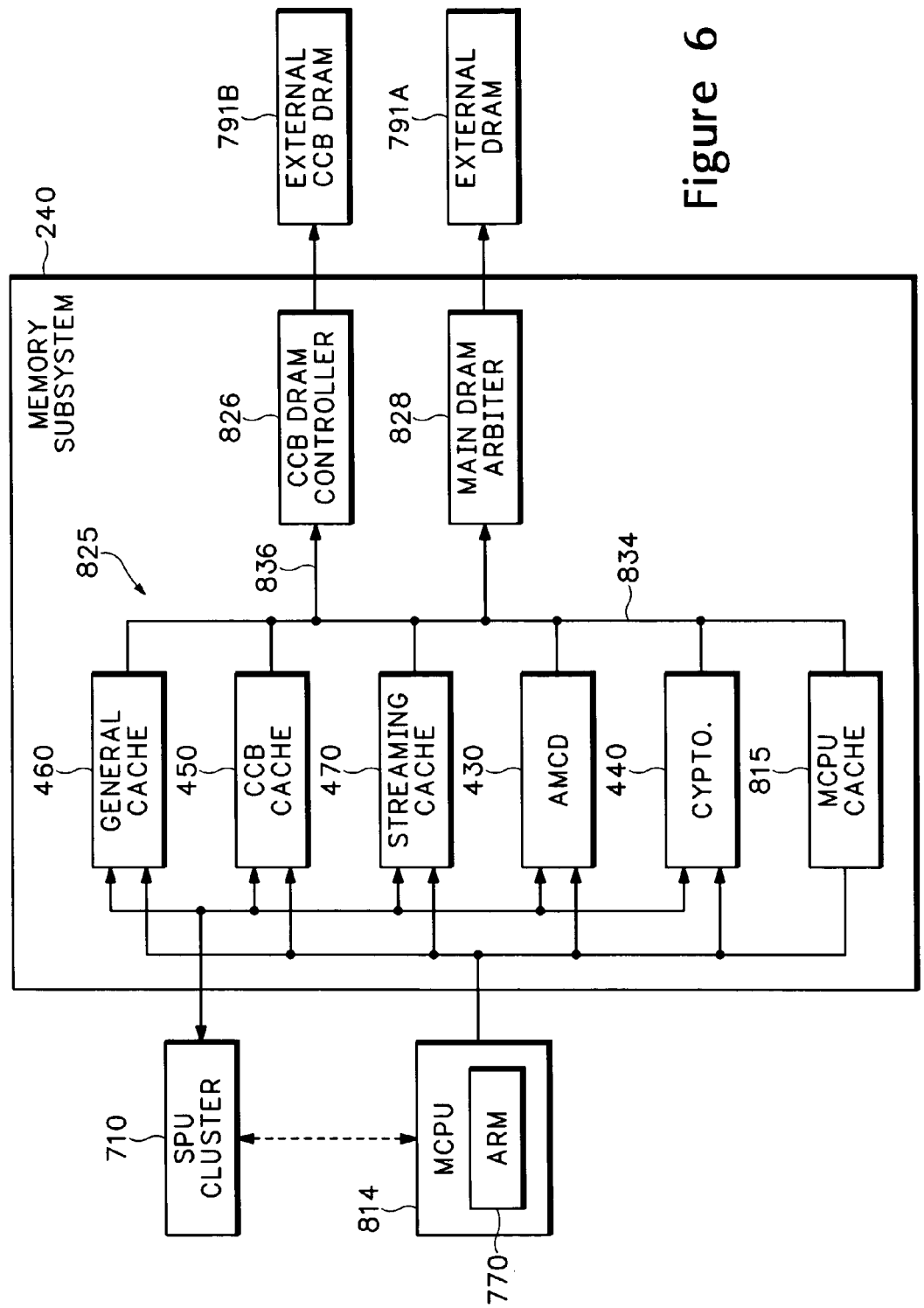
FIG. 6 shows a more detailed block diagram of the memory subsystem used in the semantic processor.

FIG. 6 shows the memory subsystem 240 in more detail. The cluster of SPUs 710 and an Advanced Reduced Instruction Set Computer (RISC) machine (ARM) 814 in MCPU 770 are connected to the memory subsystem 240. In an alternative embodiment, the ARM 814 is coupled to the memory subsystem 240 through the SPUs 710. The memory subsystem 240 includes multiple different cache regions 460, 450, 470, 430, 440 and 815 that are each adapted for different types of memory access. The multiple cache regions 460, 450, 470, 430, 440 and 815 are referred to generally as cache regions 825. The SPU cluster 710 and the ARM 814 communicate with any of the different caches regions 825 that then communicate with an external Dynamic Random Access Memory (DRAM) 791A through a main DRAM arbiter 828. In one implementation, however, the CCB cache 450 may communicate to a separate external CCB DRAM 791B through a CCB DRAM controller 826.

The different cache regions 825 improve DRAM data transfers for different data processing operations. The general cache 460 operates as a conventional cache for general purpose memory accesses by the SPUs 710. For example, the general cache 460 may be used for the general purpose random memory accesses used for conducting general control and data access operations.

Cache line replacement in the CCB cache 450 is controlled exclusively by software commands. This is contrary to conventional cache operations where hardware controls contents of the cache according to what data previously occupied a cache line position. Controlling the CCB cache region 450 with software prevents the cache from prematurely reloading cache lines that may need some intermediary processing by one or more SPUs 710 before being loaded or updated from external DRAM 791B.

The streaming cache 470 is primary used for processing streaming packet data. The streaming cache 470 prevents streaming packet transfers from replacing all cache lines in say the general cache 460. The streaming cache 470 is implemented as a cache instead of a First In-First Out (FIFO) memory buffer since it is possible that one or more of the SPUs 710 may need to access data contained in the streaming cache 470. If a FIFO were used, the streaming data could only be read after it had been loaded into the external DRAM 791A. The streaming cache 470 includes multiple buffers that each can contain different packet streams. This allows different SPUs 710 to access different packet streams while located in streaming cache 470.

The MCPU 770 contains an ARM 814 used for transferring data to and from DRAM 791A. An MCPU cache 815 improves the efficiency of burst mode accesses between the ARM 814 and the external DRAM 791A. The cache 815 may be internal or external to the MCPU 770 and in one embodiment is 32 bits wide. The MCPU cache 815 is directed specifically to handle 32 burst bit transfers. The MCPU cache 815 may buffer multiple 32 bit bursts from the ARM 814 and then burst to the external DRAM 791A when cache lines reach some threshold amount of data. The MCPU cache 815 buffers relatively small non-time critical data transfers from the MCPU 770 into one or more 32 bit blocks. The MCPU cache 815 can then burst the 32 bit blocks of data to external DRAM 791A. This prevents small bits or byte transfers by MCPU 770 from repeatedly disrupting other data transfers to and from DRAM 791A.

In one embodiment, each of the cache regions 825 may map physically to different associated regions in the external DRAM 791A and 791B. This plus the separate MCPU 771 prevents the instruction transfers between the ARM 814 and external DRAM 791A from being polluted by data transfers conducted in other cache regions. For example, the SPUs 710 can load data through the cache regions 460, 450, and 470 without polluting the instruction space used by the ARM 814.

S-Code

Figure 7:
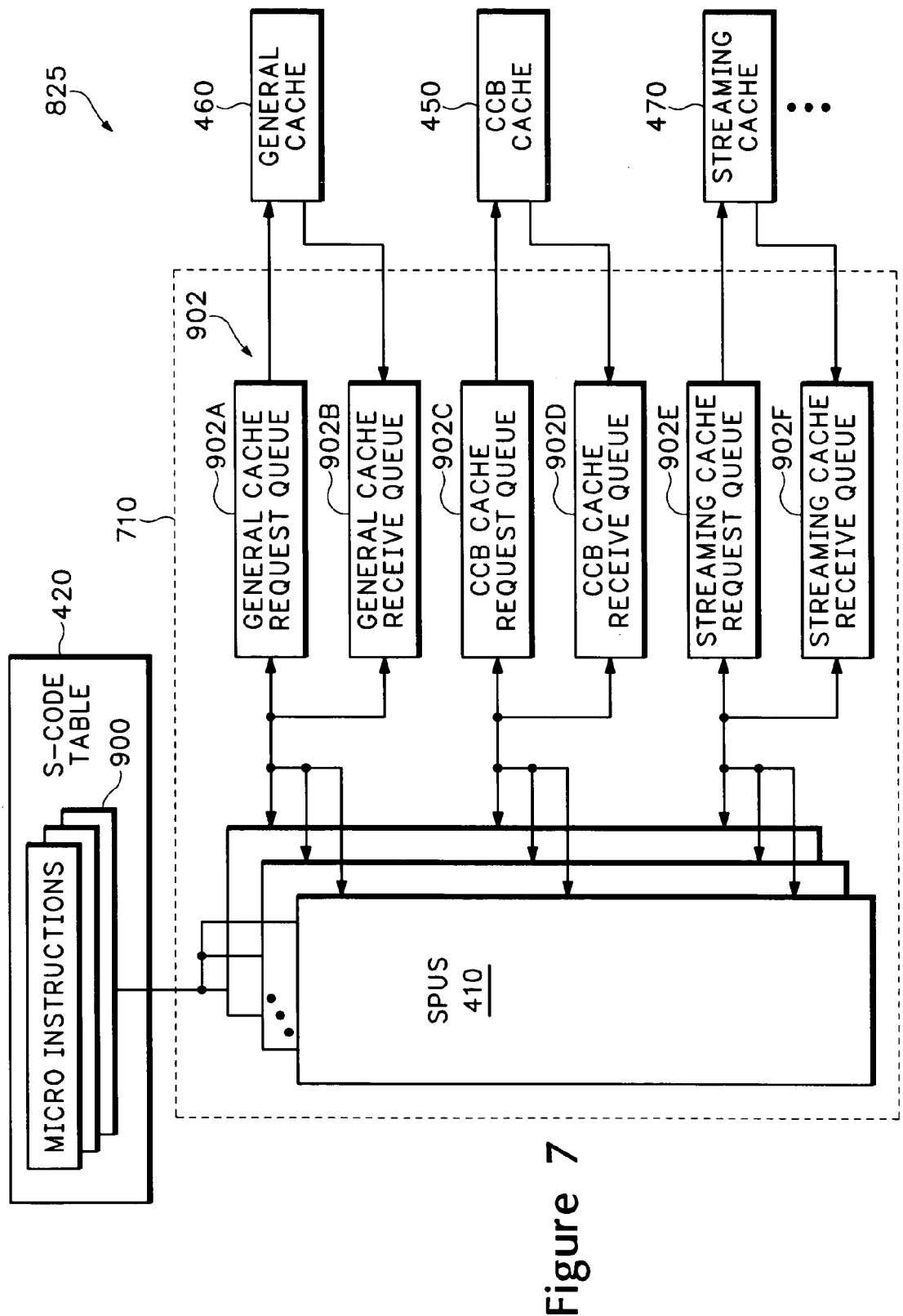
FIG. 7 shows how Semantic Processing Units (SPUs) in the semantic processor communicate with the memory subsystem.

FIG. 7 shows in more detail how memory accesses are initiated by the individual SPUs 410 to the different cache regions 825. For simplicity, only the general cache 460, CCB cache 450, and the streaming cache 470 are shown in FIG. 7.

Microinstructions 900, are alternatively referred to as SPU code or S-Code. The microinstructions 900 are launched according to the results of parsing by the direct execution parser 180 (FIG. 1). The DXP 180 identifies a Semantic Entry Point (SEP) and the SPUs 420 then receive corresponding microinstructions 900 from SCT 420. An example of a microinstruction 900 is shown in more detail in FIG. 8. The microinstruction 900 may include a target field 914 that indicates to the individual SPUs 410 which cache region 825 to use for accessing data. For example, the cache region field 914 in FIG. 8 directs the SPU 410 to use the CCB cache 450. The target field 914 can also be used to direct the SPUs 410 to access the MCPU cache 815 (FIG. 6), recirculation buffer 160 (FIG. 1), or output buffers 750 (FIG. 5).

Referring back to FIG. 7, each cache region 825 has an associated set of queues 902 in the SPU subsystem 710. The individual SPUs 410 send data access requests to the queues 902 that then provide orderly access to the different cache regions 825. The queues 902 also allow different SPUs 410 to conduct or initiate memory accesses to the different cache regions 825 at the same time.

Figure 9:
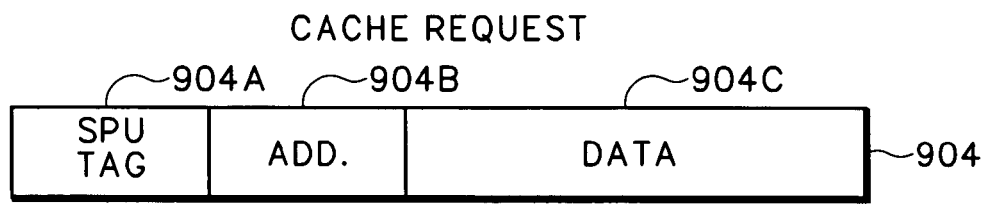
FIG. 9 shows a sample cache request made by one of the SPUs.

FIG. 9 shows an example of a cache request 904 sent between the SPUs 410 and the cache regions 825. The cache request 904 includes the address 904B and any associated data 904C. In addition, the cache request 904 includes a SPU tag 904A that identifies what SPU 410 is associated with the request 904. The SPU tag 904A tells the cache regions 825 which SPU 410 to send back any requested data.

Arbitration

Referring back to FIG. 6, of particular interest is the DRAM arbiter 828 that in one embodiment uses a round robin arbitration for determining when data from the different data cache regions 825 gain access to external DRAM 791A. In the round robin arbitration scheme, the main DRAM arbiter 828 goes around in a predetermined order checking if any of the cache regions 825 has requested access to external DRAM 791A. If a particular cache region 825 makes a memory access request, it is granted access to the external DRAM 791A during its associated round robin period. The arbiter 828 then checks the next cache region 825 in the round robin order for a memory access request. If the next cache region 825 has no memory access request, the arbiter 828 checks the next cache region 825 in the round robin order. This process continues with each cache region 825 being serviced in the round robin order.

Accesses between the CCB cache 450 and external DRAM 791A can consume a large amount of bandwidth. Accordingly, a CCB DRAM controller 826 can be used exclusively for CCB transfers between the CCB cache 450 and a separate external CCB DRAM 791B. Two different busses 834 and 836 can be used for the accesses to the two different banks of DRAM 791A and 791B, respectively. The external memory accesses by the other cache regions 460, 470, 430, 440 and 815 are then arbitrated separately by the main DRAM arbiter 828 over bus 834. If the CCB cache 450 is not connected to external DRAM through a separate CCB controller 826, then the main DRAM controller 828 arbitrates all accesses to the external DRAM 791A for all cache regions 825.

In another embodiment, the accesses to the external DRAM 791A and external CCB DRAM 791B are interleaved. This means that the CCB cache 450, and the other cache regions 825, can conduct memory accesses to both the external DRAM 791A and external CCB DRAM 791B. This allows two memory banks 791A to be accessed at the same time. For example, the CCB cache 450 can conduct a read operation from external memory 791A and at the same time conduct a write operation to external memory 791B.

General Cache

Figure 10:
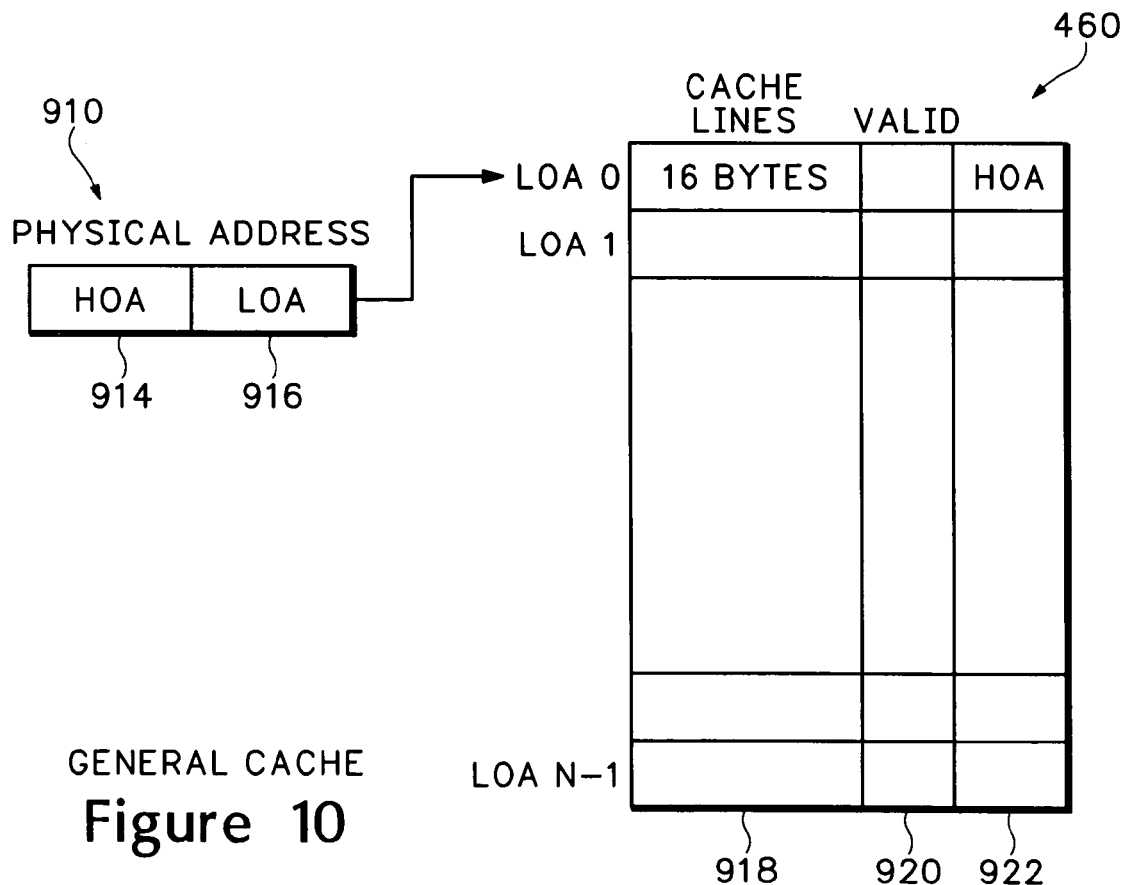
FIG. 10 shows in more detail a general cache architecture.

FIG. 10 shows in more detail one example of a general cache 460. The general cache 460 receives a physical address 910 from one of the SPUs 410 (FIG. 7). The cache lines 918 are accessed according to a low order address space (LOA) 916 from the physical address 910.

In one example, the cache lines 918 may be relatively small or have a different size than the cache lines used in other cache regions 825. For example, the cache lines 918 may be much smaller than the size of the cache lines used in the streaming cache 470 and the CCB cache 450. This provides more customized memory accesses for the different types of data processed by the different cache regions 825. For example, the cache lines 918 may only be 16 bytes long for general control data processing. On the other hand, the cache lines for the streaming cache 470 may have larger cache lines, such as 64 bytes, for transferring larger blocks of data.

Each cache line 918 may have an associated valid flag 920 that indicates whether or not the data in the cache line is valid. The cache lines 918 also have an associated high order address (HOA) field 922. The general cache 460 receives the physical address 910 and then checks HOA 922 and valid flag 920 for the cache line 918 associated with the LOA 916. If the valid flag 920 indicates a valid cache entry and the HOA 922 matches the HOA 914 for the physical address 910, the contents of the cache line 918 are read out to the requesting SPU 410. If flag field 920 indicates an invalid entry, the contents of cache line 918 are written over by a corresponding address in the external DRAM 791A (FIG. 6).

If flag field 920 indicates a valid cache entry, but the HOA 922 does not match the HOA 914 in the physical address 910, one of the entries in cache lines 918 is automatically loaded into the external DRAM 791A and the contents of external DRAM 791A associated with the physical address 910 are loaded into the cache lines 918 associated with the LOA 916.

Context Control Block (CCB) Cache

Figure 11:
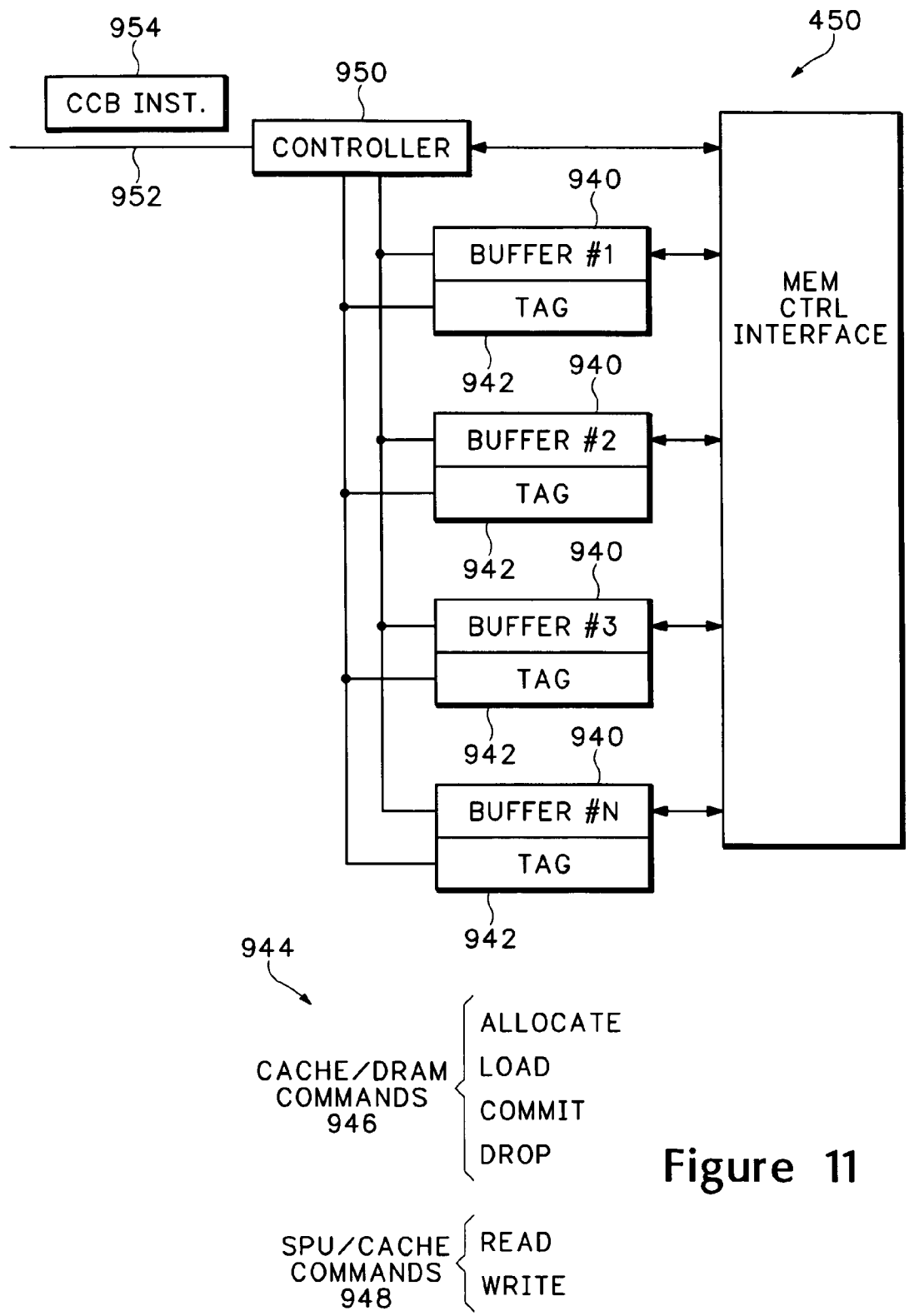
FIG. 11 shows in more detail a Context Control Block (CCB) cache architecture.

FIG. 11 shows in more detail the context control block (CCB) cache 450. The CCB 450 includes multiple buffers 940 and associative tags 942. As opposed to a conventional 4-way associative cache, the CCB 450 operates essentially like a 32 way associative cache. The multiple CCB buffers 940 and associative tags 942 are controlled by a set of software commands 944 sent through the SPUs 410. The software commands 944 include a set of Cache/DRAM commands 946 used for controlling the transfer of data between the CCB cache 450 and the external DRAM 791A or 791B (FIG. 6). A set of SPU/cache commands 948 are used for controlling data transfers between the SPUs 410 and the CCB cache 450. The software commands 946 include ALLOCATE, LOAD, COMMIT AND DROP operations. The software commands 948 include READ and WRITE operations.

Figure 12:
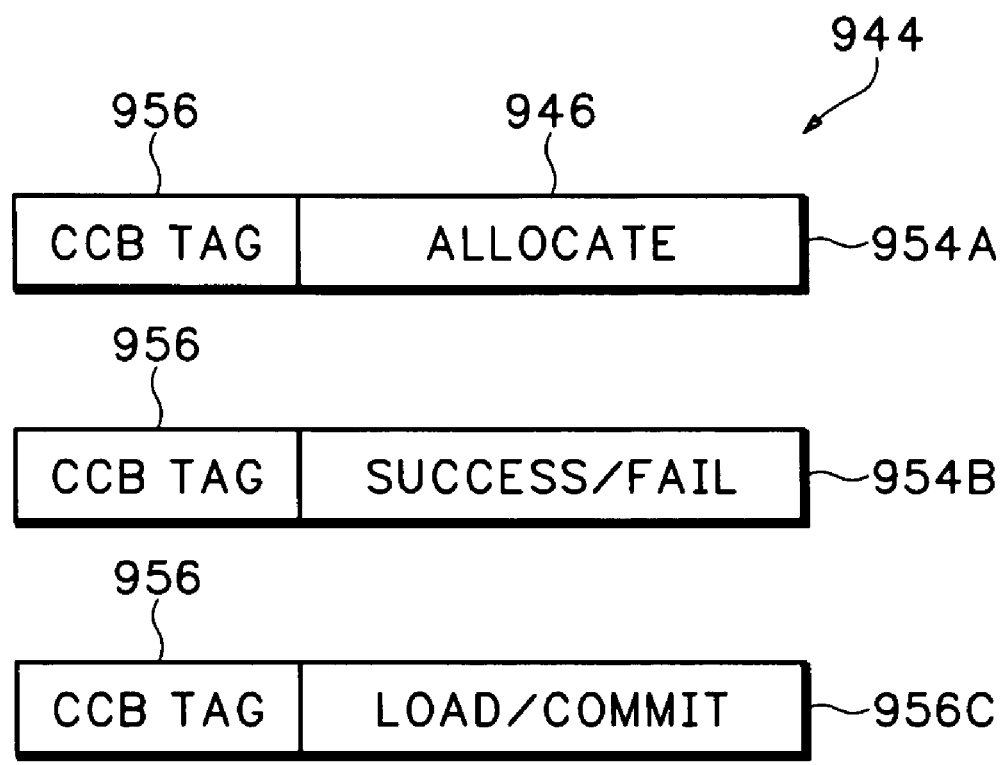
FIG. 12 shows CCB instructions sent by SPUs.

FIG. 12 shows some examples of CCB commands 944 sent between the SPUs 410 and the CCB cache 450. Any of these software commands 944 can be issued by any SPU 410 to the CCB cache 450 at any time.

Referring to FIGS. 11 and 12, one of the SPUs 410 sends the ALLOCATE command 954A to the CCB cache 450 to first allocate one of the CCB buffers 940. The ALLOCATE command 954A may include a particular memory address or CCB tag 956 associated with a physical address in DRAM 791 containing a CCB. The controller 950 in the CCB cache 450 conducts a parallel match of the received CCB address 956 with the addresses or tags associated with the each of the buffers 940. The addresses associated with each buffer 940 are contained in the associated tag fields 942.

If the address/tag 956 is not contained in any of the tag fields 942, the controller 950 allocates one of the unused buffers 940 to the specified CCB tag 956. If the address already exists in one of the tag fields 942, the controller 950 uses the buffer 940 already associated with the specified CCB tag 956.

The controller 950 sends back a reply 954B to the requesting SPU 410 that indicates weather or not a CCB buffer 940 has been successfully allocated. If a buffer 940 is successfully allocated, the controller 950 maps all CCB commands 944 from all SPUs 410 that use the CCB tag 956 to the newly allocated buffer 940.

There are situations where the SPUs 410 may not care about the data that is currently in the external DRAM 791 for a particular memory address. For example, when the data in external DRAM 791 is going to be overwritten. In conventional cache architectures, the contents of any specified address not currently contained in the cache is automatically loaded into the cache from main memory. However, the ALLOCATE command 946 simply allocates one of the buffers 940 without having to first read in data from the DRAM 791.

Thus, the buffers 940 can also be used as scratch pads for intermediate data processing without ever reading or writing the data in buffers 940 into or out of the external DRAM 791.

The LOAD and COMMIT software commands 946 are required to complete the transfer of data between one of the cache buffers 940 and the external DRAM 791. For example, a LOAD command 956C is sent from a SPU 410 to the controller 950 to load a CCB associated with a particular CCB tag 956 from external DRAM 791 into the associated buffer 940 in CCB cache 450. The controller 950 may convert the CCB tag 956 into a physical DRAM address and then fetch a CCB from the DRAM 791 associated with the physical DRAM address.

A COMMIT command 956C is sent by a SPU 410 to write the contents of a buffer 940 into a physical address in DRAM 791 associated with the CCB tag 956. The COMMIT command 956C also causes the controller 950 to deallocate the buffer 940 making it available for allocating to another CCB. However, another SPU 410 can later request buffer allocation for the same CCB tag 956. The controller 950 uses the existing CCB currently located in buffer 940 if the CCB still exists in one of the buffers 940.

The DROP command 944 tells the controller 950 to discard the contents of a particular buffer 940 associated with a specified CCB tag 956. The controller 950 discards the CCB simply by deallocating the buffer 940 in CCB cache 450 without ever loading the buffer contents into external DRAM 791.

The READ and WRITE commands 948 in FIG. 11 are used to transfer CCB data between the CCB cache 450 and the SPUs 410. The READ and WRITE instructions only allow a data transfer between the SPUs 410 and the CCB cache 450 when a buffer 940 has previously been allocated.

If all the available buffers 940 are currently in use, then one of the SPUs 410 will have to COMMIT one of the currently used buffers 940 before the current ALLOCATE command can be serviced by the CCB cache 450. The controller 950 keeps track of which buffers 940 are assigned to different CCB addresses. The SPUs 410 only need to keep a count of the number of currently allocated buffers 940. If the count number reaches the total number of available buffers 940, one of the SPUs 410 may issue a COMMIT or DROP command to free up one of the buffers 940. In one embodiment, there are at least twice as many buffers 940 as SPUs 410. This enables all SPUs 410 to have two available buffers 940 at the same time.

Because the operations in the CCB cache 450 are under software control, the SPUs 410 control when buffers 940 are released and transfer data to the external memory 791. In addition, one SPU 410 that initially allocates a buffer 940 for a CCB can be different from the SPU 410 that issues the LOAD command or different from the SPU 410 that eventually releases the buffer 940 by issuing a COMMIT or DROP command.

The commands 944 allow complete software control of data transfers between the CCB cache 450 and the DRAM 791. This has substantial advantages when packet data is being processed by one or more SPUs 410 and when it is determined during packet processing that a particular CCB no longer needs to be loaded into or read from DRAM 791. For example, one of the SPUs 410 may determine during packet processing that the packet has an incorrect checksum value. The packet can be DROPPED from the CCB buffer 940 without ever loading the packet into DRAM 791.

The buffers 940 in one embodiment are implemented as cache lines. Therefore, only one cache line ever needs to be written back into external DRAM memory 791. In one embodiment, the cache lines are 512 bytes and the words are 64 bytes wide. The controller 950 can recognize which cache lines have been modified and during a COMMIT command only write back the cache lines that have been changed in buffers 940.

Figure 13:
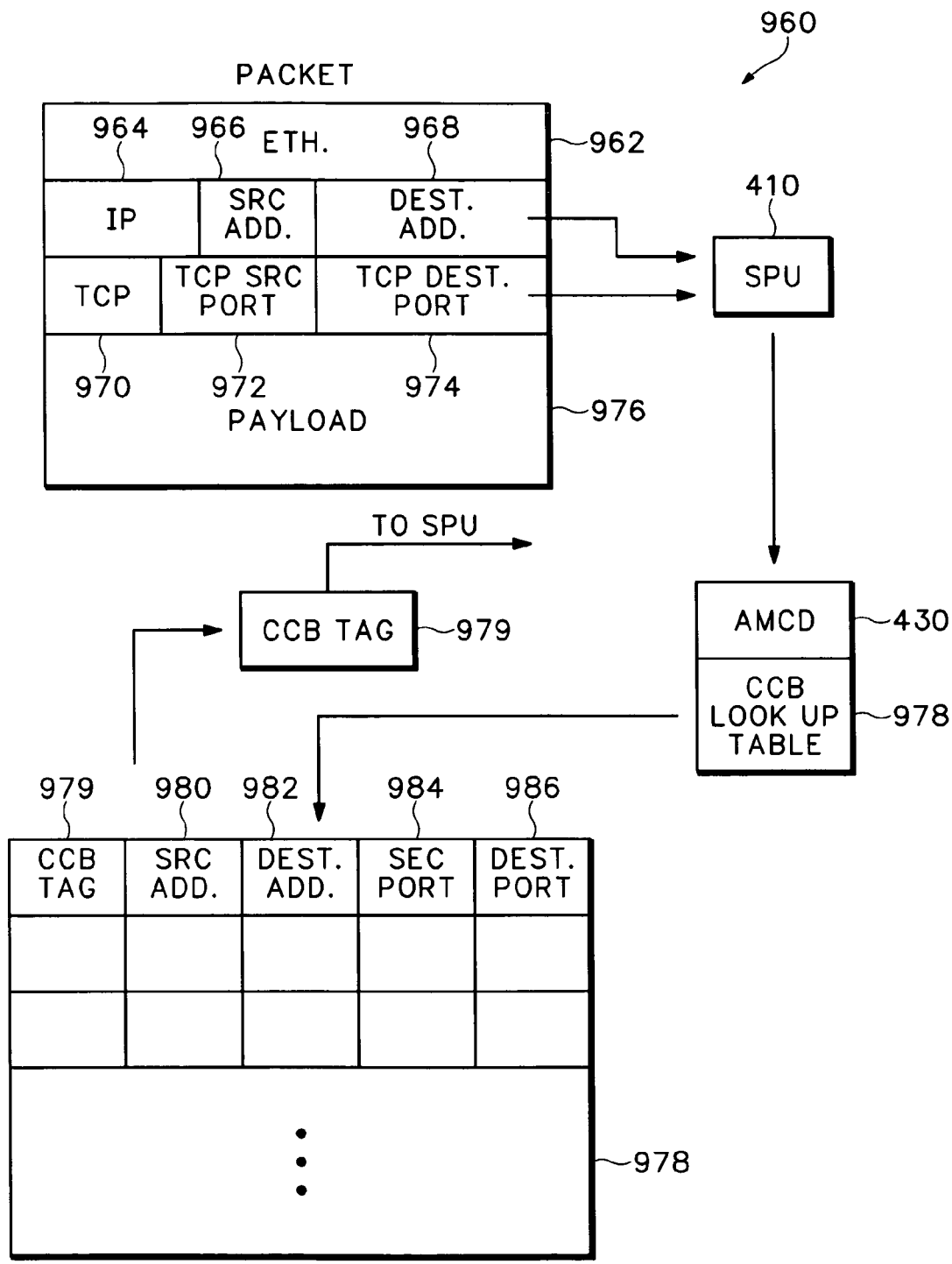
FIG. 13 shows how CCBs are identified by the SPUs.

FIG. 13 shows an example of how CCBs are used when processing TCP sessions. The semantic processor 100 (FIG. 1) can be used for processing any type of data; however, the TCP packet 960 is shown for explanation purposes. The packet 960 in this example includes an Ethernet header 962, an IP header 964, IP source address 966, IP destination address 968, TCP header 970, TCP source port address 972, TCP destination port address 974, and a payload 976.

The direct execution parser 180 directs one or more of the SPUs 410 to obtain the source address 966 and destination address 968 from the IP header 964 and obtain the TCP source port address 972 and TCP destination port address 974 from the TCP header 970. This data may be located in the input buffer 140 (FIG. 1).

The SPU 410 sends the four address values 966, 968, 972 and 974 to a CCB lookup table 978 in the AMCD 430. The lookup table 978 includes arrays of IP source address fields 980, IP destination address fields 982, TCP source port address fields 984, and TCP destination port address fields 986. Each unique combination of addresses has an associated CCB tag 979.

The AMCD 430 tries to match the four address values 966, 968, 972 and 974 with four entries in the CCB lookup table 978. If there is no match, the SPU 410 will allocate a new CCB tag 979 for the TCP session associated with packet 960 and the four address values are written into table 978. If a match is found, then the AMCD 430 returns the CCB tag 979 for the matching combination of addresses.

Figure 8:
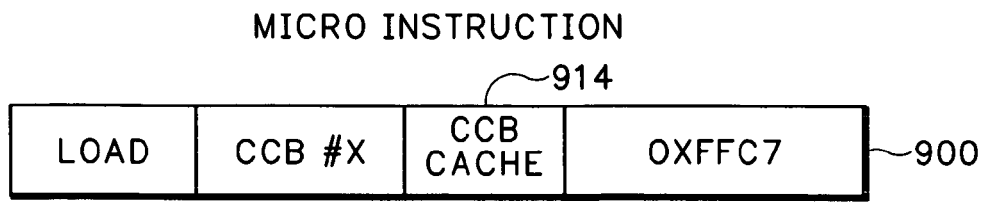
FIG. 8 shows a sample SPU microinstruction.

If a CCB tag 979 is returned, the SPU 410 uses the returned CCB tag 979 for subsequent processing of packet 960. For example, the SPU 410 may load particular header information from the packet 960 into a CCB located in CCB cache 450. In addition, the SPU 410 may send payload data 976 from packet 960 to the streaming cache 470 (FIG. 8).

Figure 14:
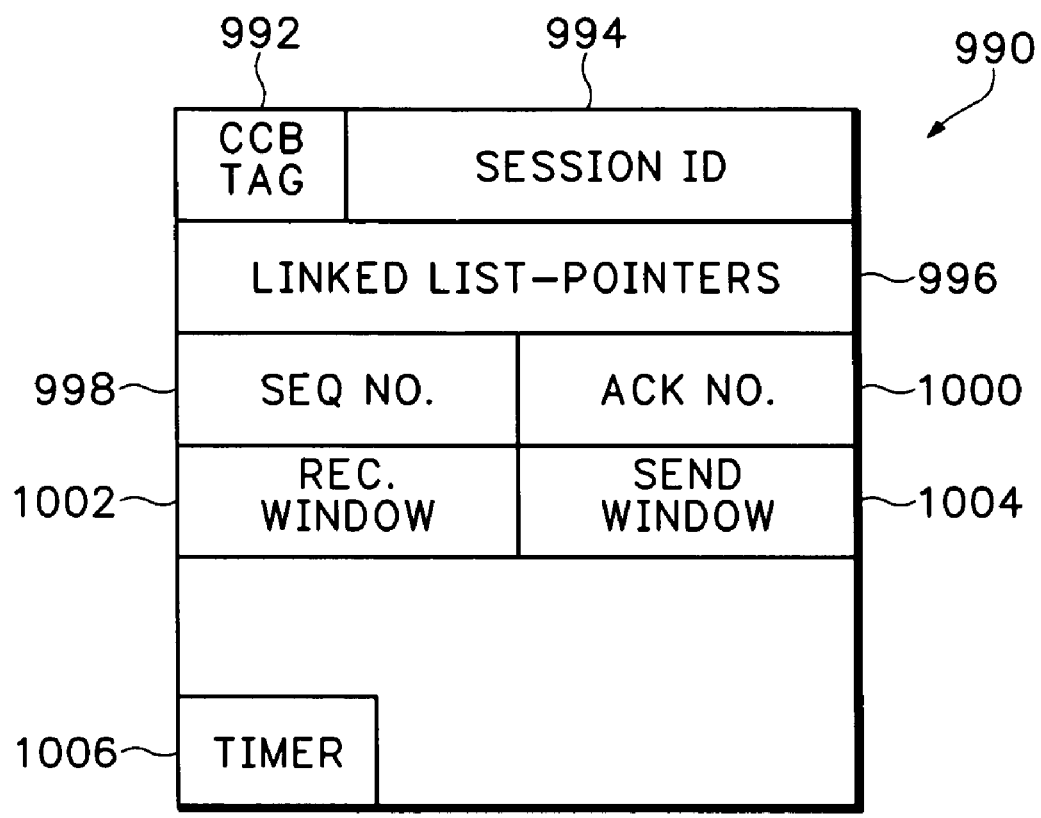
FIG. 14 shows a sample CCB.

FIG. 14 shows some of the control information that may be contained in a CCB 990 contained in the buffers 940 in CCD cache 450. The CCB 990 may contain the CCB tag 992 along with a session ID 994. The session ID 994 may contain the source and destination address for the TCP session. The CCB 990 may also include linked list pointers 996 that identify locations in external memory 791 that contain the packet payload data. The CCB 990 can also contain a TCP sequence number 998 and an acknowledge number 1000. The CCB 990 can include any other parameters that may be needed to process the TCP session. For example, the CCB 990 may include a receive window field 1002, send window field 1004, and a timer field 1006.

All of the TCP control fields are located in the same associated CCB 990. This allows the SPUs 410 to quickly access all of the associated fields for the same TCP session from the same CCB buffer 940 in the CCB cache 450. Further, because the CCB cache 450 is controlled by software, the SPUs 410 can maintain the CCB 990 in the CCB cache 450 until all required processing is completed by all the different SPUs 410.

There could also be CCBs 990 associated with different OSI layers. For example, there may be CCBs 990 associated and allocated with SCSI sessions and other CCBs 990 associated and allocated for TCP sessions within the SCSI sessions.

Figure 15:
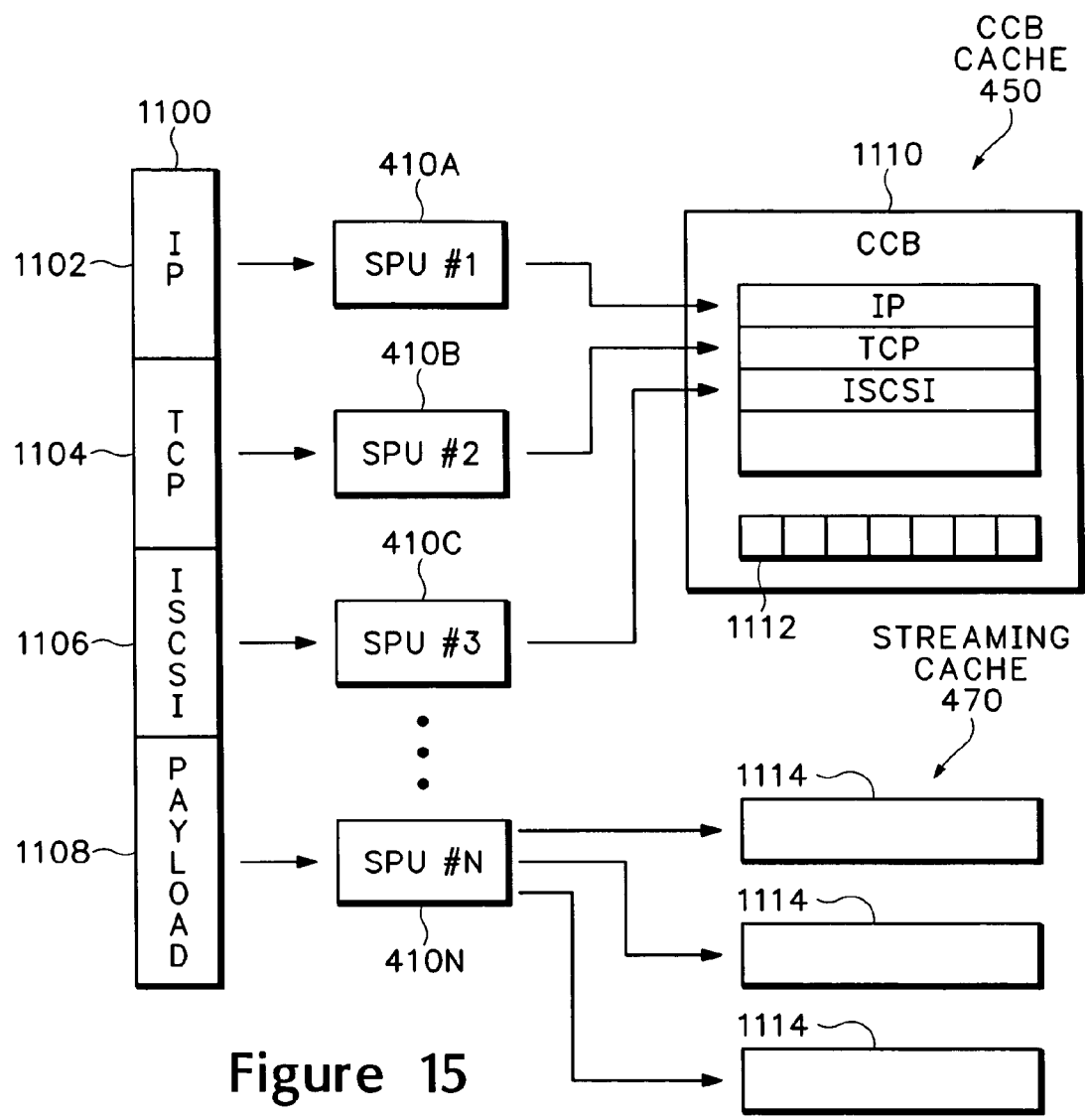
FIG. 15 shows how different SPUs access CCB information for the same packet.

FIG. 15 shows how flags 1112 are used in the CCB cache 450 to indicate when SPUs 410 are finished processing the CCB contents in buffers 940 of the CCB cache 450 and when the buffers 940 are available to be released for access by another SPU.

An IP packet 1100 is received by the processing system 100 (FIG. 1). The IP packet 1100 has header sections including an IP header 1102, TCP header 1104 and ISCSI header 1106. The IP packet 1100 also includes a payload 1108 containing packet data. The parser 180 (FIG. 1) may direct different SPUs 410 to process the information in the different IP header 1102, TCP header 1104, ISCSI header 1106 and the data in the payload 1108. For example, a first SPU 410A processes the IP header information 1102, a SPU 410B processes the TCP header information 1104, and a SPU 410C processes the ISCSI header information 1106. Another SPU 410N may be directed to load the packet payload 1108 into buffers 1114 in the streaming cache 470. Of course, any combination of SPUs 410 can process any of the header and payload information in the IP packet 1100.

All of the header information in the IP packet 1100 can be associated with a same CCB 1110. The SPUs 1-3 store and access the CCB 1110 through the CCB cache 450. The CCB 1110 also includes a completion bit mask 1112. The SPUs 410 logically OR a bit in the completion mask 1112 when their task is completed. For example, the SPU 410A may set a first bit in the completion bit mask 1112 when processing of the IP header 1102 is completed in the CCB 1110. The SPU 410B may set a second bit in the completion bit mask 1112 when processing for the TCP header 1104 is complete. When all of the bits in the completion bit mask 1112 are set, this indicates that SPU processing is completed on the IP packet 1100.

The SPU 410N checks the completion mask 1112. If all of the bits in mask 1112 are set, SPU 410N may for example send a COMMIT command that directs the CCB cache 450 to COMMIT the contents of the cache lines containing CCB 1110 into external DRAM memory 791.

Streaming Cache

Figure 16:
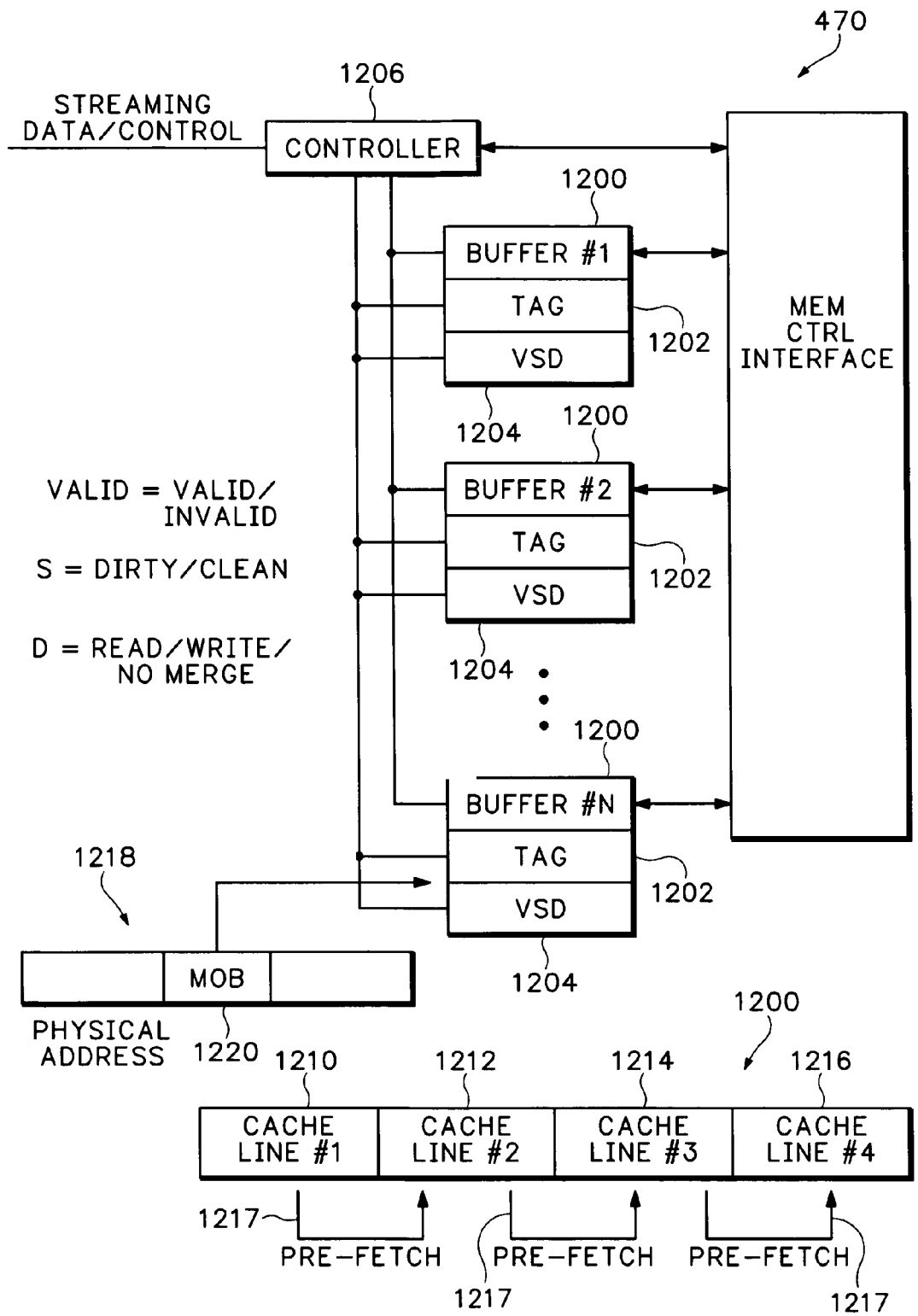
FIG. 16 shows a more detailed diagram of a streaming cache used in the memory subsystem.

FIG. 16 shows the streaming cache 470 in more detail. In one embodiment, the streaming cache 470 includes multiple buffers 1200 used for transmitting or receiving data from the DRAM 791. The buffers 1200 in one example are 256 bytes wide and each cache line includes a tag field 1202, a VSD field 1204, and a 64 byte portion of the buffer 1200. Thus, four cache lines are associated with each buffer 1200. The streaming cache 470 in one implementation includes two buffers 1200 for each SPU 410.

The VSD field 1204 includes a Valid value that indicates a cache line as valid/invalid, a Status value that indicates a dirty or clean cache line, and a Direction value that indicates a read, write or no merge condition.

Of particular interest is a pre-fetch operation conducted by the cache controller 1206. A physical address 1218 is sent to the controller 1206 from one of the SPUs 410 requesting a read from the DRAM 791. The controller 1206 associates the physical address 1218 with one of the cache lines, 1200, 1202, 1204 such as cache line 1210. The streaming cache controller 1206 then automatically conducts a pre-fetch 1217 for the three other 64 byte cache lines 1212, 1214 and 1216 associated with the same FIFO order of bytes in the buffer 1200.

One important aspect of the pre-fetch 1217 is the way that the tag fields 1202 are associated with the different buffers 1200. The tag fields 1202 are used by the controller 1206 to identify a particular buffer 1200. The portion of the physical address 1218 associated with the tag fields 1202 is selected by the controller 1206 to prevent the buffers 1200 from containing contiguous physical address locations. For example, the controller 1206 may use middle order bits 1220 of the physical address 1218 to associate with tag fields 1202. This prevents the pre-fetch 1217 of the three contiguous cache lines 1212, 1214, and 1216 from colliding with streaming data operations associated with cache line 1210.

For example, one of the SPUs 410 may send a command to the streaming cache 470 with an associated physical address 1218 that requires packet data to be loaded from the DRAM memory 791 into the first cache line 1210 associated with a particular buffer 1200. The buffer 1200 has a tag value 1202 associated with a portion of the physical address 1218. The controller 1206 may then try to conduct the pre-fetch operations 1217 to also load the cache lines 1212, 1214 and 1216 associated with the same buffer 1200. However, the pre-fetch 1217 is stalled because the buffer 1200 is already being used by the SPU 410. In addition, when the pre-fetch operations 1217 are allowed to complete, they could overwrite the cache lines in the buffer 1200 that were already loaded pursuant to other SPU commands.

By obtaining the tag values 1202 from middle order bits 1220 of the physical address 1218, each consecutive 256 byte physical address boundary will be located in a different memory buffer 1200, thus, avoiding collisions during the pre-fetch operations.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A memory subsystem, comprising:
multiple different caches configured for different types of data transfer operations between one or more processing units and a main memory; and
an arbiter that arbitrates requests by the multiple different caches for accessing the main memory, wherein at least one of the caches is a streaming cache having larger buffers than some of the other caches for handling large packet data memory accesses,
wherein the streaming cache loads data for a received memory request from the main memory into a cache line and then automatically pre-fetches additional data associated with the same received memory request into other cache lines in the same streaming cache and
the streaming cache pre-fetches data corresponding with middle bits from a physical address used in the received memory request so the different data fetches will load data into different cache lines.

2. A memory subsystem, comprising:
multiple different caches configured for different types of data transfer operations between one or more processing units and a main memory;
an arbiter that arbitrates requests by the multiple different caches for accessing the main memory;
a first general cache configured for general random memory accesses, a context control block (CCB) cache providing software controlled cache operations, and a streaming cache configured for large packet data memory accesses.

3. The memory subsystem according to claim 2 wherein the Context Control Block (CCB) cache is configured to contain CCBs that store parameters used for tracking and managing packets and the streaming cache is used for transferring the packets into the main memory, the CCB cache and streaming cache both accessible at the same time by different processing units.

4. A memory subsystem, comprising:
multiple different caches configured for different types of data transfer operations between one or more processing units and a main memory; and
an arbiter that arbitrates requests by the multiple different caches for accessing the main memory;
a Context Control Block (CCB) cache that includes buffers and associated CCB tags, the CCB cache managing the buffers according to software commands received from the processing units.

5. The memory subsystem according to claim 4 wherein the software commands include an allocate command that causes the CCB cache to allocate one of the buffers to a CCB tag value without first reading data associated with the CCB tag value from the main memory.

6. The memory subsystem according to claim 5 wherein the software commands include a load command that causes the CCB cache to load a CCB associated with a particular CCB tag value from main memory into one of the buffers.

7. The memory subsystem according to claim 6 wherein the software commands include a commit command that cause the CCB cache to write contents from one of the buffers into the main memory.

8. The memory subsystem according to claim 7 wherein the software commands include a drop command that cause the CCB cache to deallocate one of the buffers associated with an identified CCB tag value without reloading the buffer with other data from the main memory.

9. The memory subsystem according to claim 4 including a CCB lookup table that maps source and destination address information for received packets with the CCB tags, the one or more processors applying the source and destination address information for incoming packets to the CCB lookup table and then using a returned CCB tag to access associated buffers in the CCB cache.

10. The memory subsystem according to claim 4 wherein the buffers are configured to contain entire CCBs that track Transmission Control Protocol/Internet Protocol (TCP/IP) sessions, the CCBs including a CCB tag field, a TCP session field, address pointers to packets in a same TCP/IP session, a TCP session number field, a TCP acknowledge number field, a receive window field, a send window field, and a timer field.

11. A memory subsystem, comprising:
multiple different caches configured for different types of data transfer operations between one or more processing units and a main memory; and
an arbiter that arbitrates requests by the multiple different caches for accessing the main memory, wherein the processing units are Semantic Processing Units (SPUs) that conduct memory access operations according to Semantic Execution Points (SEPs) that are independently identified during a data parsing operation by a direct execution parser.

12. A software controlled cache, comprising:
multiple buffers for caching data for a memory;
address tags associated with the multiple buffers;
a controller that manages cache operations for the multiple buffers according to a received address corresponding to the address tags and cache commands received from a processor that direct the controller which cache operations to perform on the buffers, wherein the controller manages a control block cache that includes control block buffers and associated control block tags, the control block cache managing the control block buffers according to software commands received from the processor.

13. The cache according to claim 12 wherein the cache commands include an allocate command that cause the controller to allocate the buffers to address tag values without reading data associated with the address tag values from the memory.

14. The cache according to claim 12 wherein the cache commands include a load command that cause the controller to load a block of data from the memory corresponding with an identified address tag value into the associated buffer.

15. The cache according to claim 12 including a commit command that cause the controller to write contents from an identified one of the buffers into the memory.

16. The cache according to claim 12 including a drop command that cause the controller to de-allocate one of the identified buffers without reloading the identified buffer with other data from the memory.

17. The cache according to claim 12 wherein the buffers are configured to store Context Control Blocks (CCBs) that are used for managing Transmission Control Protocol/Internet Protocol (TCP/IP) sessions;
the CCBs including a CCB tag field, a TCP session field, pointers to corresponding TCP/IP packets in the main memory, a TCP session number field, a TCP acknowl-edge number field, a receive window field, a send window field, and a timer field.

18. A processor, comprising:
one or more processing units processing input data; and
a memory subsystem including multiple different caches each configured for caching different types of data between the processing units and a memory, wherein the memory subsystem includes a control cache configured to buffer control data that contain fields used for tracking Internet Protocol sessions for received packets and a general cache configured for general random memory accesses.

19. The semantic processor according to claim 18 wherein the control cache is a Context Control Block (CCB) cache configured to buffer CCBs.

20. The semantic processor according to claim 18 including an array data circuit that contains a lookup table that maps source and destination addresses to control tags, the one or more processing units applying the source and destination addresses for received packets to the lookup table and then using the control tags received back from the array data circuit to access control data through the control cache.

21. The semantic processor according to claim 18 including a streaming data cache having larger buffers than the control cache for caching the packets in the Internet protocol sessions tracked by the control data in the control cache.

22. The semantic processor according to claim 21 wherein the streaming data cache reads packet data into a first cache line in response to a packet read request and then automatically pre-fetches additional packet data from other memory addresses corresponding to the same packet read request so that the additional packet data is not buffered in the first cache line.

23. The semantic processor according to claim 21 wherein one or more processing units can access both the control cache and the streaming data cache at the same time.

24. The semantic processor according to claim 18 including an arbiter that arbitrates between the different caches for accessing the main memory.

25. The semantic processor according to claim 18 including a software controlled cache that conducts cache operations according to cache commands received from the one or more processing units.

26. The semantic processor according to claim 25 wherein the cache commands received from the one or more processing units include the following:
an allocate command that causes the controller to allocate the buffers to address tags without first reading data associated with the addresses from the main memory;
a load command that causes a block of data from main memory corresponding with an identified address tag to be loaded into an associated buffer;
a commit command that causes contents of an buffer identified with an address tag to be written into the main memory; and
a drop command that de-allocates one of the buffers associated with a received address tag without automatically reloading the buffer with other data from the main memory.

* * * * *